R. W. SELLEW.
PROCESS OF MANUFACTURING BALL BEARINGS.
APPLICATION FILED MAY 22, 1920.
1,375,020.
Patented Apr. 19, 1921.
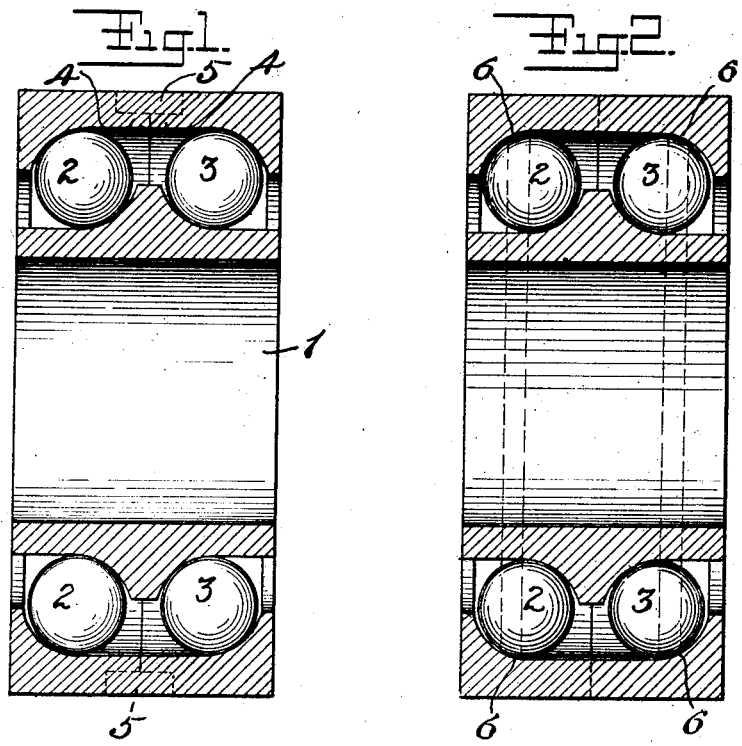
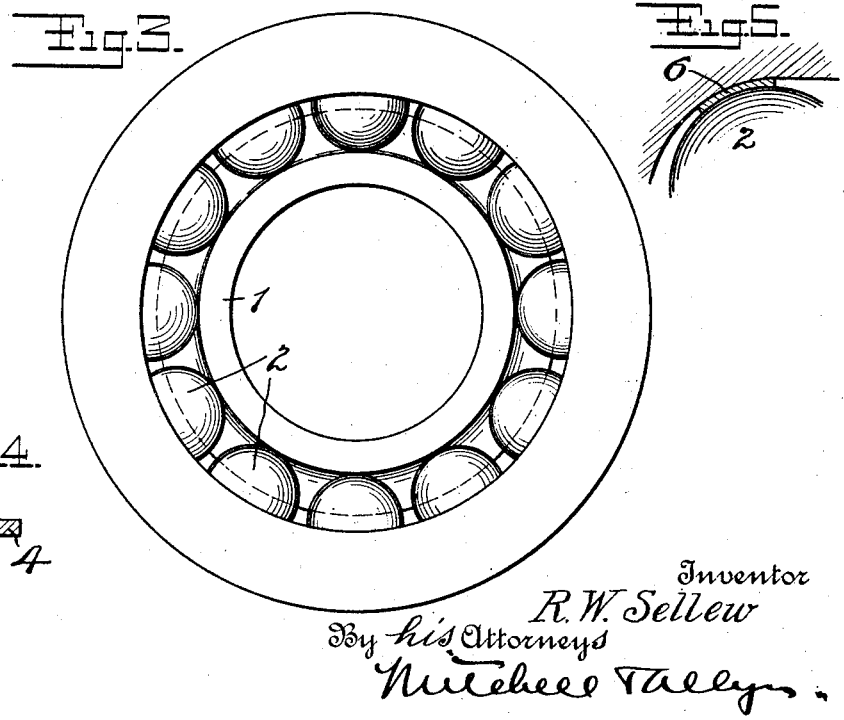

UNITED STATES PATENT OFFICE.

ROLAND WINCHESTER SELLEW, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

PROCESS OF MANUFACTURING BALL-BEARINGS.

1,375,020.  Specification of Letters Patent.  Patented Apr. 19, 1921.

Application filed May 22, 1920. Serial No. 383,524.

*To all whom it may concern:*

Be it known that I, ROLAND W. SELLEW, a citizen of the United States of America, residing at New Britain, Connecticut, have invented a new and useful Process for Manufacturing Ball-Bearings, of which the following is a specification.

My invention relates to new and improved processes for manufacturing ball bearings of the "unitary" type and the same is especially useful as applied to duplex or double row ball bearings in which it is desirable to have the load on the respective rows of balls carried in opposite oblique directions whereby the finished bearing will successfully withstand both radial and thrust loads. Heretofore, many means have been devised to facilitate the assembly of such bearings and frequently one of the bearing rings has been made of two separate pieces mechanically connected. These methods have not proved entirely satisfactory. By my improvement each of the two bearing rings, the inner one and the outer one, is a solid or integral member in its finished state. To accomplish this, I have devised unique welding processes which may be practiced without danger of distorting or displacing the bearing rings. My processes likewise avoid undue cramping or binding of the race-ways on the balls.

In the drawings:

Figure 1 is a sectional view of a bearing constructed to embody my invention and made by one process.

Fig. 2 is a similar view of the bearing made by another process.

Fig. 3 is a side elevation of the complete bearing made by either of the aforesaid processes.

Figs. 4 and 5 are fragmentary detail views.

In the bearing of Fig. 1, the process of manufacture comprises assembling on one ring, for example the inner ring 1, the series of balls 2—3. In the drawings, I have shown no ball spacer but any well known spacer may be employed if a spacer is desired. I then assemble on the balls two ring sections, each of said ring sections being of substantially such a cross section as illustrated in Fig. 4 in which each ring section is provided with a spacer flange 4 with the recess outside of the same. These ring sections and flanges are so proportioned that when the two sections are assembled with their flanges 3 meeting, as shown in Fig. 1, the bearing race-ways of the two rings will properly engage the balls. I then introduce into the recessed portion of the ring adjacent to the spacers 4 a ring-like fillet piece 5. I then place the bearing in a suitable holder so as to hold the parts assembled, as aforesaid. I then apply an electric welding process to the metal of the bearing ring and the fillet piece 5, so as to cause the metal to become welded and integrally united thereby converting the two ring sections, which form this bearing ring, into one integral structure. By this construction there is no danger of causing one side of the bearing to operate unevenly on the balls. There is no danger of binding unduly on the balls, and the finished structure possesses all of the desired qualities of a perfect bearing in which the balls operate to hold both rings in an assembled state and also in an adjusted relation, not only after the bearing is completed but also while the welding is being performed.

The process resorted to in the production of the bearing shown in Fig. 2 comprises making two separate ring sections to form one of the bearing rings, in this instance the outer bearing ring, then assembling the balls on the other bearing ring with or without a spacer as desired, then placing one or more destructible shims 6 between the ball race-way tracks and the adjacent balls, one of said shims being shown in exaggerated form in Fig. 5, then placing the bearing thus assembled in the proper holder and applying an electric welding process to the abutting edges of the two ring sections so as to homogeneously unite the same in one integral structure. After the welding operation is completed, the destructible shim is cut out or otherwise removed. The destructible shim operates as an adequate spacer to prevent the two ring sections of the outer bearing ring from being forced too tightly against the balls during the welding operation, which if not guarded against, would result in the undue binding of the bearing rings on the balls. The destructible shims should of course be of the proper thickness depending upon the particular bearing and should be of uniform thickness wherever they contact with the balls and the adjacent race-ways, so that the bearing rings will engage the balls evenly all around.

I have shown the process as applied to the outer bearing ring, but I do not wish to be limited thereto.

It should be understood that I do not wish to limit myself to the particular form of destructible shim shown herein, for instance, those parts of the raceways which take the thrust might have applied thereto destructible material which might be painted on or otherwise applied and which could be removed after the bearing is completed to give the desired freedom of action of the bearing rings on the balls. The showing in the drawing of the shim 6 may be regarded as conventionally showing a material which is caused to adhere to the race-ways or a separate non-adhesive strip of paper or the like.

What I claim is:

1. The process of forming a ball bearing of the type described and including two bearing rings having complementary race-ways with balls therebetween, said balls operating to hold said rings in operative and adjusted relation to each other, said process comprising making one of said bearing rings of two ring sections each having a ball track thereon and assembling said balls and rings with two edges of the two ring sections of one bearing ring in close relation to each other, then welding said two edges together to integrally unite the said two ring sections to form a unitary bearing ring, said balls acting as spacers for said ring sections during the welding operation.

2. The process of constructing a bearing of the type referred to including two bearing rings each having complementary ball race-ways with balls therebetween, said process comprising first forming one of the bearing rings as an integral unitary structure and the other bearing ring of two separate pieces each piece having a single raceway track therein, then assembling the several parts with one or more desctructible shims between one or more of the rows of balls and the adjacent track or tracks, then welding the adjacent edges of the two ring sections to form an integral unitary bearing ring of said two ring sections, then removing said destructible shims.

3. The process of forming a ball bearing of the type described comprising two bearing rings having complementary race-ways therein with balls therebetween, one of said bearing rings being made from two separate ring sections, each provided with a ball race, assembling said parts and bringing said ring sections into close relation at their adjacent edges, then applying a third ring-like piece to bridge the adjacent edges of the ring-like sections, then welding together the two ring-like sections and the third ring-like piece to form an integral unitary bearing ring.

4. The process of forming a ball bearing of the type described comprising two bearing rings having complementary race-ways therein for receiving balls, one of said rings being first made of two pieces divided circumferentially, then assembling the balls between said rings and then connecting the two-piece ring by welding so as to convert the same into an integral structure, said balls acting as spacers for said ring sections during the welding operation.

5. The process of forming a unitary ball bearing having two bearing rings with balls therebetween which serve to hold said ring sections together and in adjusted relation, comprising, mounting a series of balls on the bearing track surface of one of said bearing rings, then applying two ring sections, each having a ball track, to opposite sides of said series of balls, and then connecting said ring sections by welding, the balls acting as spacing devices to correctly position said ring sections during said welding operation whereby the track portion of both of said ring sections will properly engage said balls.

ROLAND WINCHESTER SELLEW.